(12) United States Patent
Christoff et al.

(10) Patent No.: US 10,155,505 B2
(45) Date of Patent: Dec. 18, 2018

(54) SPRING-BASED FORCE-FEEDBACK DEVICE

(71) Applicant: GM GLOBAL TECHNOLOGY OPERATIONS LLC, Detroit, MI (US)

(72) Inventors: Brian D. Christoff, Ann Arbor, MI (US); John K. Dagg, Shelby Township, MI (US); Michael L. Bailey, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 15/381,256

(22) Filed: Dec. 16, 2016

(65) Prior Publication Data

US 2018/0170325 A1   Jun. 21, 2018

(51) Int. Cl.

| | |
|---|---|
| *G05G 1/30* | (2008.04) |
| *B60T 7/04* | (2006.01) |
| *G05G 5/03* | (2008.04) |
| *B60K 26/02* | (2006.01) |
| *G05G 5/05* | (2006.01) |
| *G05G 1/38* | (2008.04) |
| *B62D 5/00* | (2006.01) |

(52) U.S. Cl.
CPC ............ *B60T 7/042* (2013.01); *B60K 26/021* (2013.01); *B62D 5/005* (2013.01); *G05G 1/38* (2013.01); *G05G 5/05* (2013.01)

(58) Field of Classification Search
CPC ... B60T 7/04; B60T 7/042; B60T 7/06; B60T 11/08; B60K 26/021; B60K 2026/023; B60K 2026/025; G05G 1/30; G05G 1/38; G05G 1/44; G05G 1/445; G05G 5/03; G05G 5/05; G05G 7/04; F16H 53/06; B62D 5/005
See application file for complete search history.

(56) References Cited

U.S. PATENT DOCUMENTS

| | | | | |
|---|---|---|---|---|
| 5,040,508 | A | * | 8/1991 | Watanabe ............... F02D 11/10 123/396 |
| 6,007,160 | A | * | 12/1999 | Lubbers ................. B60T 7/042 188/358 |
| 6,098,971 | A | * | 8/2000 | Stege ..................... F02D 11/02 267/216 |

(Continued)

FOREIGN PATENT DOCUMENTS

GB              974498 A  * 11/1964  ............... G05G 7/04

*Primary Examiner* — Adam D Rogers

(57) ABSTRACT

A force-feedback assembly includes a first shaft with a shaft end. The first shaft is movable between a shaft first position and a shaft second position. The force-feedback assembly also includes a compliant element arranged to exert a return force on the first shaft and bias the first shaft toward the shaft first position. The force-feedback assembly additionally includes a ramp in sliding engagement with the shaft end. The force-feedback assembly further includes an operator input device operatively coupled to the ramp. The operator input device has a device first position and a device second position. Moving the operator input device from the device first position to the device second position slides the ramp relative to the shaft end and moves the first shaft from the shaft first position to the shaft second position.

16 Claims, 6 Drawing Sheets

(56) References Cited

U.S. PATENT DOCUMENTS

| | | | | |
|---|---|---|---|---|
| 6,526,844 | B1* | 3/2003 | Weis | B60K 26/021 |
| | | | | 188/83 |
| 6,817,437 | B2* | 11/2004 | Magnus | B62D 5/006 |
| | | | | 180/403 |
| 9,176,515 | B2* | 11/2015 | Maruyama | B60K 26/021 |
| 9,182,774 | B2* | 11/2015 | Drews | B60K 26/021 |
| 9,447,854 | B2* | 9/2016 | Kim | F16H 25/183 |
| 2005/0097983 | A1* | 5/2005 | Mannle | B60K 26/021 |
| | | | | 74/560 |
| 2010/0300240 | A1* | 12/2010 | Kim | G05G 1/30 |
| | | | | 74/513 |
| 2012/0096976 | A1* | 4/2012 | Leone | G05G 1/30 |
| | | | | 74/513 |

\* cited by examiner

SPRING-BASED FORCE-FEEDBACK DEVICE

TECHNICAL FIELD

The present disclosure relates to motor vehicles. More particularly, the present disclosure relates to such vehicles having electrically-controlled braking, shifting, steering, or other "drive-by-wire" systems.

INTRODUCTION

In automotive and other vehicles, a variety of operator input devices are provided. These input devices include steering wheels, pedals, and other devices configured to receive input from an operator indicative of the operator's desired control of a vehicle system. Traditionally, these input devices were mechanically connected to the vehicle system controlled by the input device. However, some vehicles are now provided with so-called drive-by-wire technology. Examples of drive-by-wire systems include brake-by-wire, steer-by-wire, or other similar systems in which the pedal, steering wheel, or other input device are connected to the controlled vehicle system electrically, rather than mechanically.

SUMMARY

A force-feedback assembly according to the present disclosure includes a shaft with a shaft end. The shaft is movable between a shaft first position and a shaft second position. The force-feedback assembly also includes a compliant element arranged to exert a return force on the shaft and bias the shaft toward the shaft first position. The force-feedback assembly additionally includes a ramp in sliding engagement with the shaft end. The force-feedback assembly further includes an operator input device operatively coupled to the ramp. The operator input device has a device first position and a device second position. Moving the operator input device from the device first position to the device second position slides the ramp relative to the shaft end and moves the shaft from the shaft first position to the shaft second position.

According to an exemplary embodiment, the compliant element includes a spring. The spring may include a spring stack with a nonlinear spring rate.

According to an exemplary embodiment, the ramp has a nonlinear profile.

According to an exemplary embodiment, the force-feedback assembly additionally includes a cam operatively coupled to the operator input device. A surface of the cam has an apply rate profile defining the ramp. In such embodiments, moving the operator input device from the device first position to the device second position drives the cam in pivoting motion. The apply rate profile may have a nonlinear progression.

A vehicle according to the present disclosure includes an operator-actuatable input device with a first position and a second position. The vehicle also includes at least one sensor arranged to detect operator actuation of the input device. The vehicle additionally includes an electronically-controlled subsystem and a controller programmed to control the subsystem in response to operator actuation of the input device. The vehicle further includes a force-feedback device. The force-feedback device is arranged to provide force-feedback to the input device in response to operator actuation of the input device. The force-feedback device has a spring rate calibratable independently of rate progression of the input device from the first position to the second position.

According to an exemplary embodiment, the force-feedback device includes a compliant element arranged to exert a return force on the input device from the second position to the first position. The compliant element may have a nonlinear spring rate. The compliant element may include a spring stack.

Some such embodiments additionally include a first shaft operably coupled to the compliant element and a second shaft operatively coupling the first shaft to the input device, with the compliant element being arranged to exert the return force on the first shaft. In such embodiments, the first shaft includes a shaft end, the second shaft is provided with a ramp, and the shaft end is in sliding engagement with the shaft end such that moving the input device from the first position to the second position slides the ramp relative to the shaft end and drives the first shaft in translation. The ramp may have a nonlinear profile. Such embodiments may include a cam operatively coupled to the second shaft with a surface of the cam having an apply rate profile defining the ramp, where moving the input device from the first position to the second position drives the cam in pivoting motion. The apply rate profile may have a nonlinear progression.

A drive-by-wire system according to the present disclosure includes an operator-actuatable input device movable between a device first position and a device second position, and at least one sensor arranged to detect operator actuation of the input device. The drive-by-wire system also includes an electronically-controlled subsystem and a controller programmed to control the subsystem in response to operator actuation of the input device. The drive-by-wire system additionally includes a first shaft with a shaft end. The first shaft is movable between a shaft first position and a shaft second position. The drive-by-wire system further includes a compliant element arranged to exert a return force on the first shaft and bias the first shaft toward the shaft first position, and a ramp operatively coupled with the input device and in sliding engagement with the shaft end. Moving the input device from the device first position to the device second position slides the ramp relative to the shaft end, which then in turn moves the first shaft from the shaft first position to the shaft second position.

According to an exemplary embodiment, the compliant element includes a spring. The spring may be a spring stack with a nonlinear spring rate.

According to an exemplary embodiment, the ramp has a nonlinear profile.

According to an exemplary embodiment, the drive-by-wire system additionally includes a cam operatively coupled to the input device. A surface of the cam has an apply rate profile defining the ramp. In such embodiments, moving the operator input device from the device first position to the device second position drives the cam in pivoting motion.

Embodiments according to the present disclosure provide a number of advantages. For example, a force-feedback device according to the present disclosure may be calibrated to provide desired force-feedback characteristics for a variety of applications.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As discussed above, in drive-by-wire vehicles, the pedal, steering wheel, or other input device are not mechanically connected to the controlled vehicle system. However, operators may be accustomed to the feedback received from traditional mechanically-connected components in the form of force transmitted through the input device. The driving experience may thus be enhanced by providing comparable force-feedback in a drive-by-wire vehicle.

Figure 1:
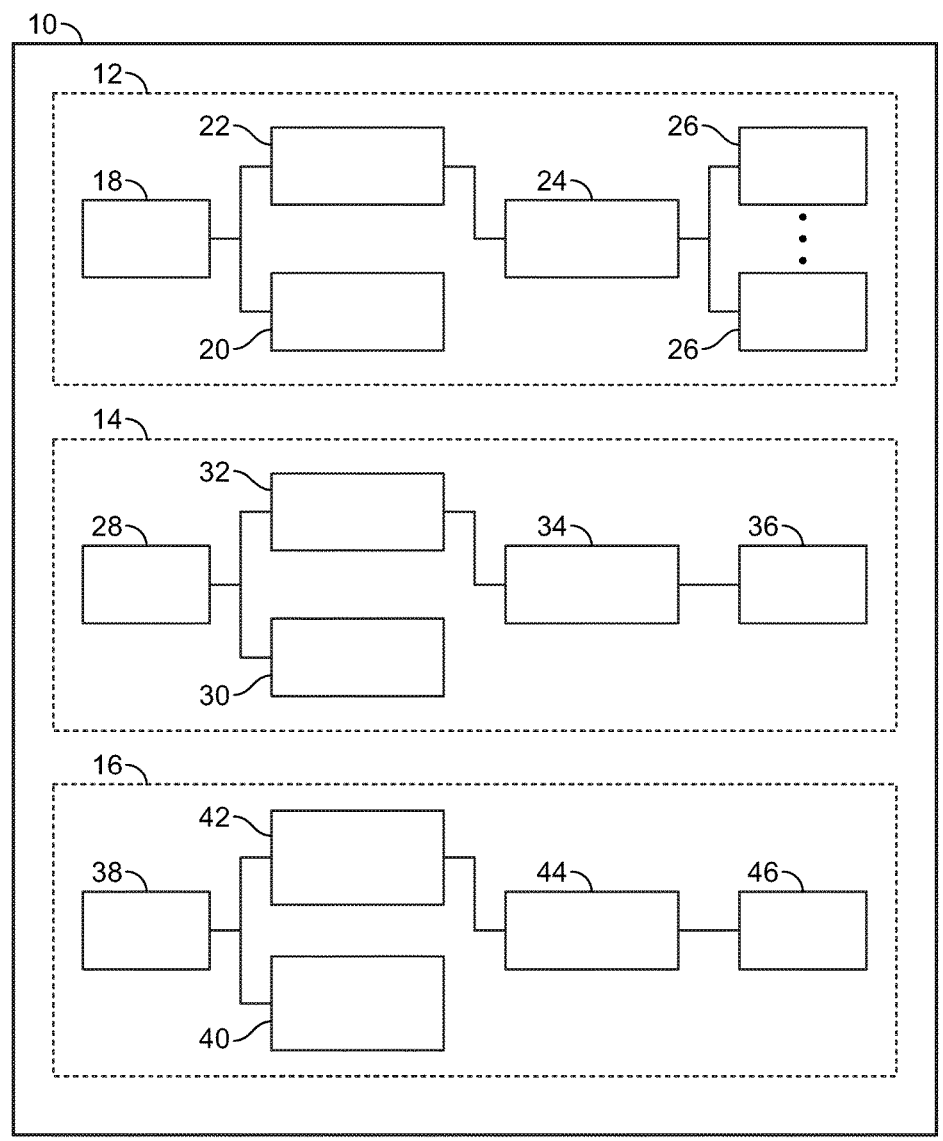
FIG. 1 is a schematic representation of a vehicle according to the present disclosure.

Referring now to FIG. 1, a vehicle 10 according to the present disclosure is illustrated schematically. The vehicle 10 includes a brake-by-wire system 12, a throttle-by-wire system 14, and a steer-by-wire system 16. It should be understood, however, that embodiments within the scope of the present disclosure may omit one or more of these systems or include additional drive-by-wire systems.

The brake-by-wire system 12 includes a brake pedal 18 arranged in an interior portion of the vehicle 10. The brake pedal 18 is configured to be actuated by an operator in order to request braking. The brake pedal 18 is coupled to a brake pedal force-feedback device 20 configured to provide force-feedback to the brake pedal 18 in response to actuation of the brake pedal 18. The force-feedback device 20 will be discussed in further detail below with respect to FIG. 2. At least one brake pedal sensor 22 is configured to detect actuation of the brake pedal 18. The brake pedal sensor 22 may include a position sensor, pressure sensor, other sensors as appropriate, or combination of sensors. The brake pedal sensor 22 is electrically connected to a brake controller 24. The brake pedal sensor 22 is configured to transmit a signal to the brake controller 24 indicative of a position of the brake pedal 18. The brake controller 24 is configured to control brake units 26 based at least in part on the signal from the brake pedal sensor 22. The brake units 26 are operatively connected to vehicle wheels and configured to selectively provide braking torque to the vehicle wheels. In various embodiments, the brake units 26 include friction brakes, electric machines configured for regenerative braking, or other devices configured to provide braking torque to the vehicle wheels.

The throttle-by-wire system 14 includes an accelerator pedal 28 arranged in an interior portion of the vehicle 10. The accelerator pedal 28 is configured to be actuated by an operator in order to request acceleration. The accelerator pedal 28 is coupled to an accelerator pedal force-feedback device 30 configured to provide force-feedback to the accelerator pedal 28 in response to actuation of the accelerator pedal 28. The force-feedback device 30 will be discussed in further detail below with respect to FIG. 2. At least one accelerator pedal sensor 32 is configured to detect actuation of the accelerator pedal 28. The accelerator pedal sensor 32 may include a position sensor, pressure sensor, other sensors as appropriate, or combination of sensors. The accelerator pedal sensor 32 is electrically connected to a power plant controller 34. The accelerator pedal sensor 32 is configured to transmit a signal to the power plant controller 34 indicative of a position of the accelerator pedal 28. The power plant controller 34 is configured to control a power plant 36 based at least in part on the signal from the accelerator pedal sensor 32. The power plant 36 is operatively connected to vehicle wheels and configured to selectively provide drive torque to the vehicle wheels. In various embodiments, the power plant 36 includes an internal combustion engine, fuel cell, traction motor, or other devices configured to provide drive torque to the vehicle wheels.

The steer-by-wire system 16 includes a steering wheel 38 arranged in an interior portion of the vehicle 10. The steering wheel 38 is configured to be actuated by an operator in order to request steering. The steering wheel 38 is coupled to a steering wheel force-feedback device 40 configured to provide force-feedback to the steering wheel 38 in response to actuation of the steering wheel 38. The force-feedback device 40 will be discussed in further detail below with respect to FIG. 2. At least one steering wheel sensor 42 is configured to detect actuation of the steering wheel 38. The steering wheel sensor 42 may include a position sensor, pressure sensor, other sensors as appropriate, or a combination of sensors. The steering wheel sensor 42 is electrically connected to a steering controller 44. The steering wheel sensor 42 is configured to transmit a signal to the steering controller 44 indicative of a position of the steering wheel 38. The steering controller 44 is configured to control a steering system 46 based at least in part on the signal from the steering wheel sensor 42. The steering system 46 is operatively connected to at least two vehicle wheels, e.g. two front wheels and configured to adjust a steering angle of the wheels. In an exemplary embodiment, the steering system 46 is provided with at least one actuator configured to mechanically adjust the steering angle under control of the steering controller 44.

While depicted as discrete units, the brake controller 24, power plant controller 34, and steering controller 44 may be embodied in a greater or smaller number of controllers collectively referred to as a "controller." The respective controllers 24, 34, and 44 may each include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the system or vehicle.

Figure 2:
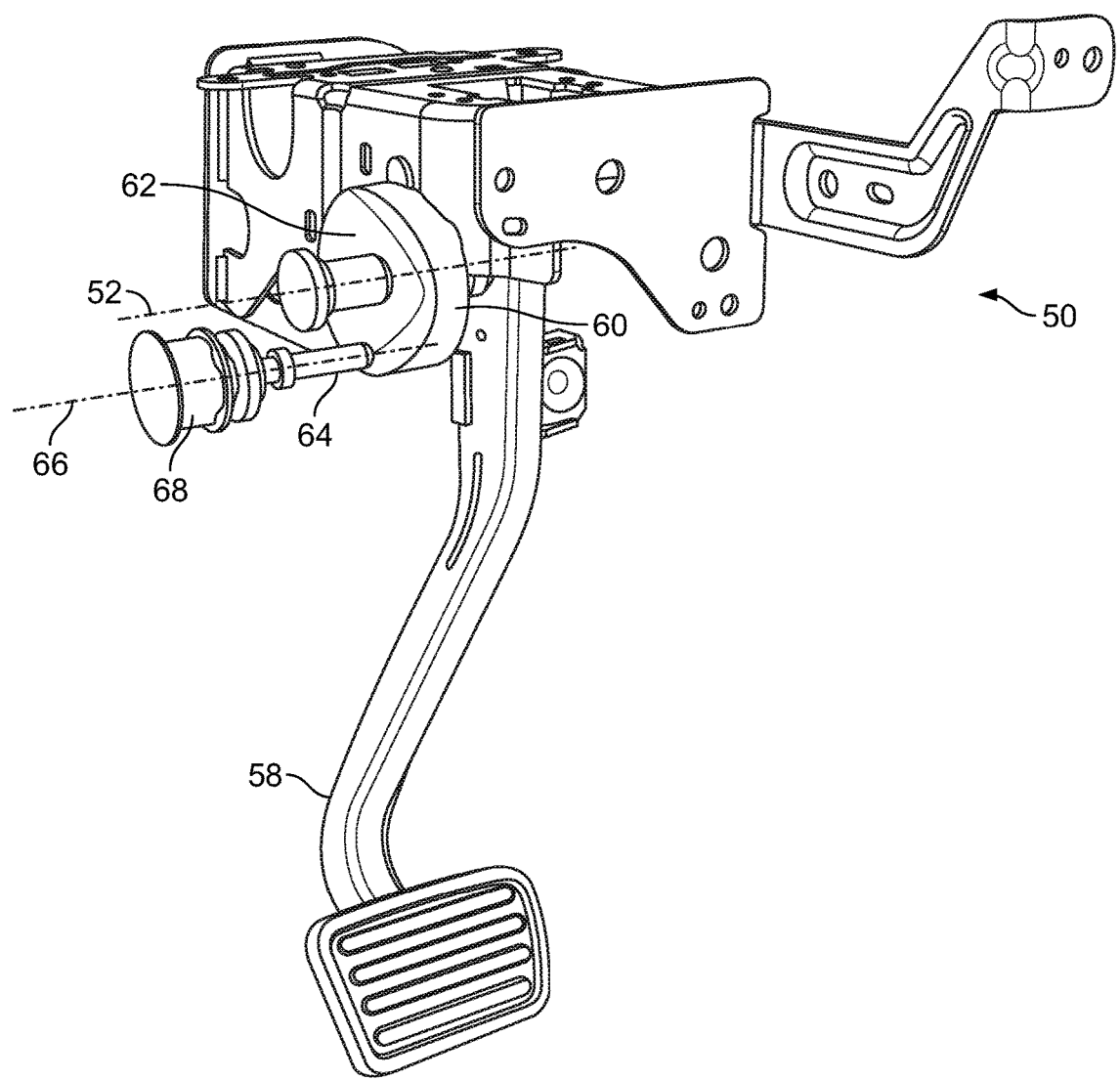
FIG. 2 is an isometric view of a first embodiment of a force-feedback device according to the present disclosure.
Figure 3:
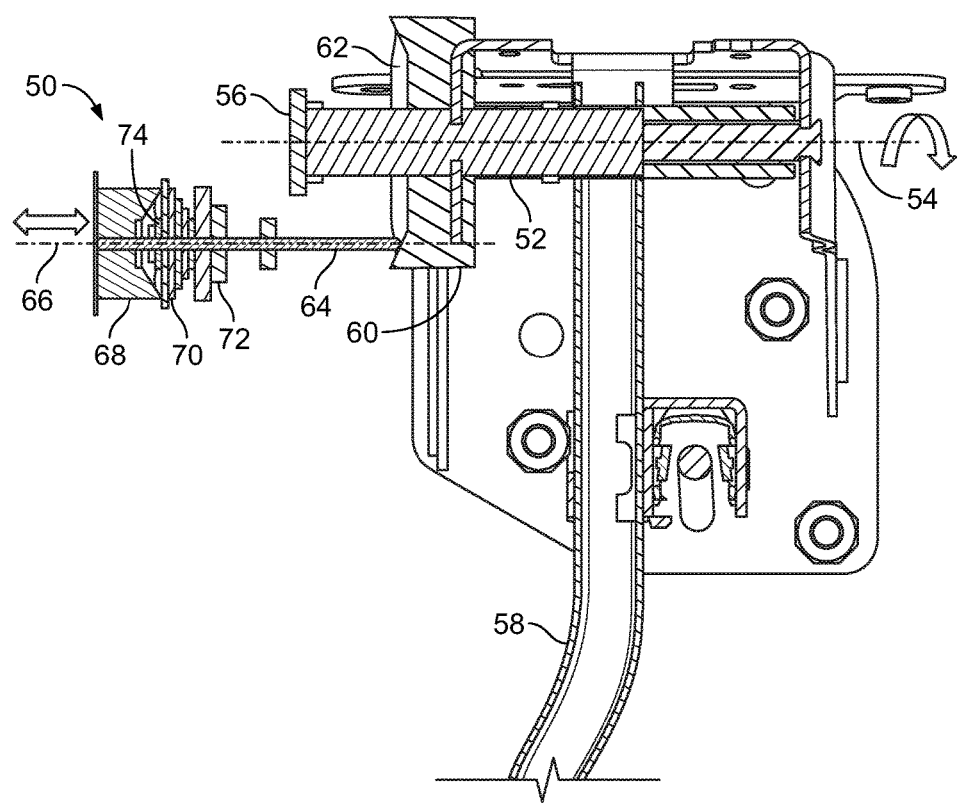
FIG. 3 is a sectional view of the first embodiment of a force-feedback device according to the present disclosure.

Referring now to FIGS. 2 and 3, a first embodiment of a force-feedback device 50 according to the present disclosure is illustrated. The force-feedback device includes a first shaft 52. The first shaft 52 has a pivot axis 54. A first end of the first shaft 52 is pivotably secured by a fixture 56, e.g. via a bearing. A second end of the first shaft 52 is coupled to an operator input device 58. While depicted here as a pedal, in other embodiments the operator input device may also be a steering wheel or other device configured to, when actuated by an operator, pivot the first shaft 52. The first shaft 52 is provided with a cam 60. One surface 62 of the cam 60 is provided with a nonplanar profile defining an apply rate, as will be discussed below. In various embodiments, the profile may have a linear or non-linear progression.

The force-feedback device 50 also includes a second shaft 64. The second shaft 64 has a central axis 66. A first end of the second shaft 64 is slidably secured by a fixture 68, and a second end of the second shaft is in sliding engagement with the surface 62. A compliant element 70 is provided on a central portion of the second shaft 64. In this embodiment, the compliant element 70 is a spring stack retained by the fixture 68 and secured to the second shaft 64 between a first fastener 72, e.g. a nut and washer, and a second fastener 74, e.g. a snap ring. In such an embodiment, the spring stack may have a linear or a nonlinear spring rate. However, other embodiments may utilize other compliant elements configured to exert a return force on the second shaft 64.

In response to an operator actuation of the operator input device 58, the first shaft 52 is pivoted relative to the pivot axis 54. The surface 62 of the cam 60 acts as a ramp, such that as the cam 60 is pivoted, the surface 62 drives the second shaft 64 in translation along the central axis 66 according to the apply rate profile.

As the second shaft 64 translates along the central axis 66, the compliant element 70 exerts a return force on the second shaft 64 in a direction opposite the translation. The magnitude of the return force is based on the magnitude of translation of the second shaft 64. The force may be felt through the operator input device 58 as force-feedback.

By selection of an appropriate compliant element 70, e.g. tuning a stacked spring, and by selection of an appropriate surface 62, e.g. tuning the apply rate profile, the spring rate and rate progression of the force-feedback device 50 may be tuned independently of one another. The force-feedback characteristic of the force-feedback device may thus be precisely calibrated for a desired response. Thus, similar force-feedback devices may be implemented in brake-by-wire, steer-by-wire, throttle-by-wire, and other appropriate systems.

Figure 4:
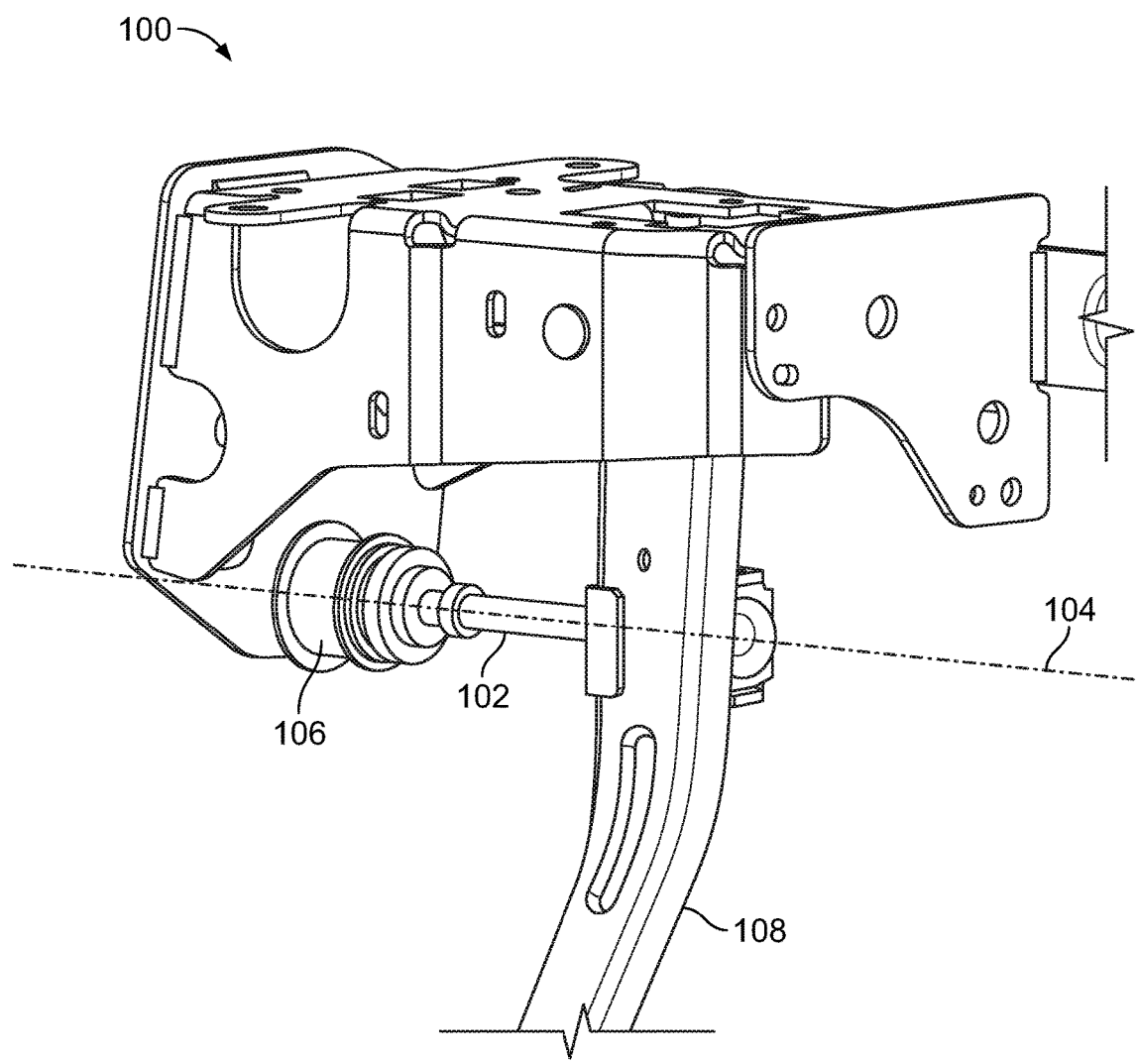
FIG. 4 is an isometric view of a second embodiment of a force-feedback device according to the present disclosure.
Figure 5:
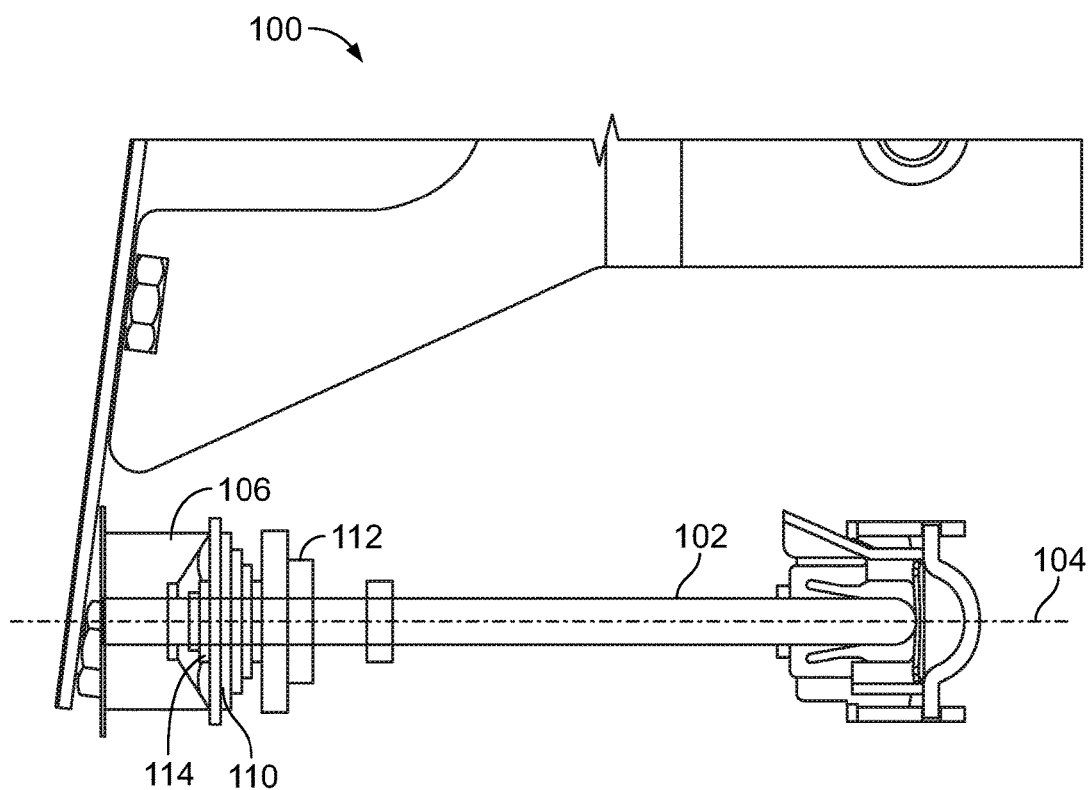
FIG. 5 is a sectional view of the second embodiment of a force-feedback device according to the present disclosure.

Referring now to FIGS. 4 and 5, a second embodiment of a force-feedback device 100 according to the present disclosure is illustrated. The force-feedback device includes a shaft 102. The shaft 102 has a central axis 104. A first end of the shaft 102 is slidably secured by a fixture 106, and a second end of the shaft 102 is in engagement with an operator input device 108. While depicted here as a pedal, in other embodiments the operator input device 108 may also be another device configured to, when actuated by an operator, translate the shaft 102. A compliant element 110 is provided on a central portion of the shaft 102. In this embodiment, the compliant element 110 is a spring stack retained by the fixture 106 and secured to the shaft 102 between a first fastener 112, e.g. a nut and washer, and a second fastener 114, e.g. a snap ring. In such an embodiment, the spring stack may have a linear or a nonlinear spring rate. However, other embodiments may utilize other compliant elements configured to exert a return force on the shaft 102.

In response to an operator actuation of the operator input device 108, the shaft 102 is translated along the central axis 104. As the shaft 102 translates along the central axis 104, the compliant element 110 exerts a return force on the shaft 102 in a direction opposite the translation. The magnitude of the return force is based on the magnitude of translation of the shaft 102. The force may be felt through the operator input device 108 as force-feedback.

Figure 6:
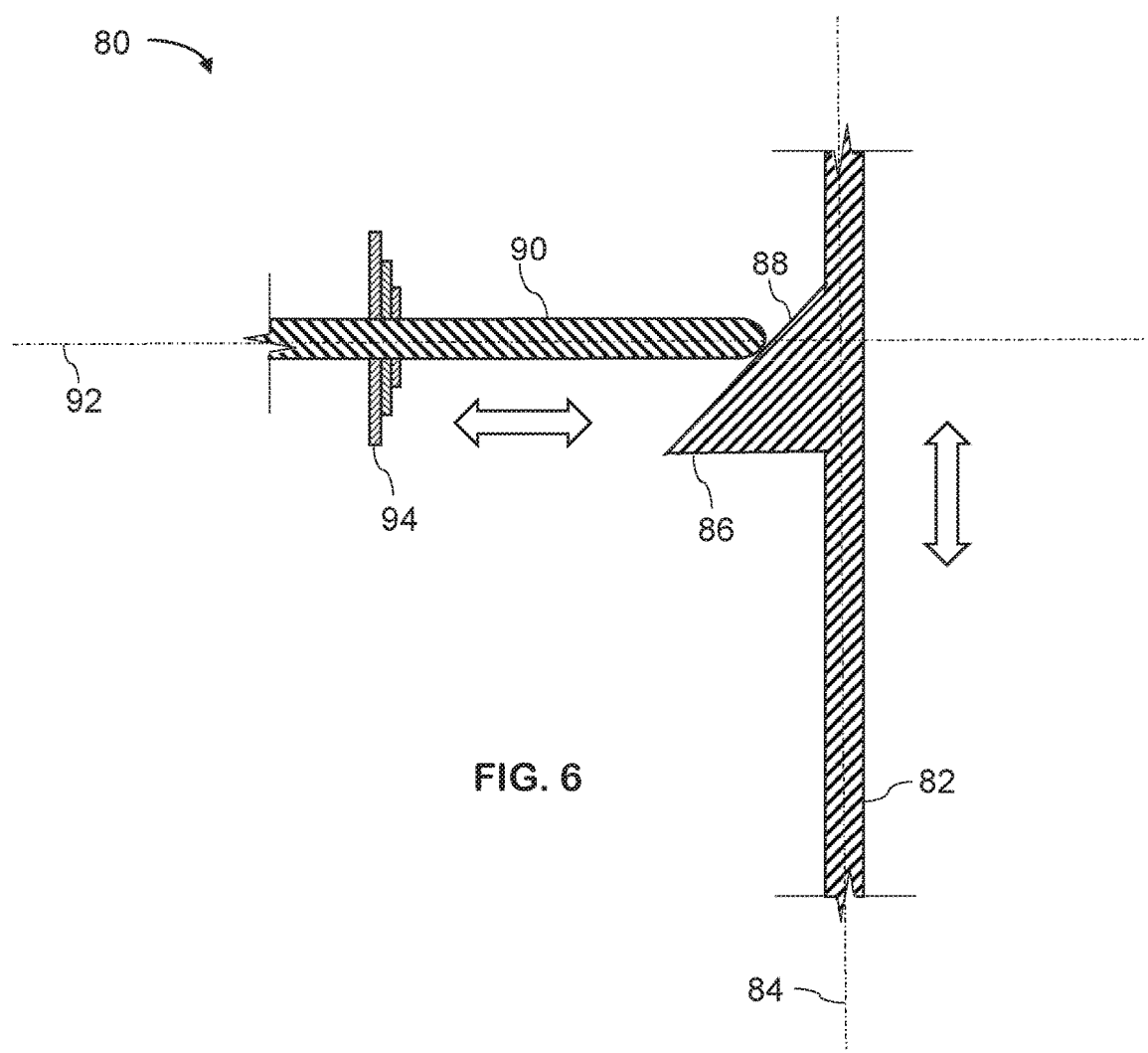
FIG. 6 is a sectional view of a third embodiment of a force-feedback device according to the present disclosure.

Referring now to FIG. 6, a third embodiment of a force-feedback device 80 according to the present disclosure is illustrated. In this embodiment, a first shaft 82 has a central axis 84. The first shaft 82 is slidably retained by a fixture and configured to translate along the central axis 84 in response to an operator actuation of an operator input device, e.g. a pedal coupled to the first shaft 82. The first shaft 82 is provided with a protrusion 86 having a surface 88 with a profile defining an apply rate, as will be discussed below. In various embodiments, the profile may have a linear or non-linear progression.

The force-feedback device 80 also includes a second shaft 90. The second shaft 90 has a central axis 92. A first end of the second shaft 90 is slidably secured by a fixture, and a second end of the second shaft is in sliding engagement with the surface 88. A compliant element 94 is provided on a central portion of the second shaft 90. In this embodiment, the compliant element 94 is a spring stack secured to the second shaft in a generally similar fashion as discussed above with respect to FIG. 2. In such an embodiment, the spring stack may have a linear or a nonlinear spring rate. However, other embodiments may utilize other compliant elements configured to exert a return force on the second shaft 90.

In response to an operator actuation of the operator input device, the first shaft 82 is translated along the central axis 84. The surface 88 of the protrusion 86 acts as a ramp, such that as the shaft 82 is translated, the surface 88 drives the second shaft 90 in translation along the central axis 92 according to the apply rate profile.

As the second shaft 90 translates along the central axis 92, the compliant element 94 exerts a return force on the second shaft 90 in a direction opposite the translation. The magnitude of the return force is based on the magnitude of translation of the second shaft 90. The force may be felt through the operator input device as force-feedback.

As may be seen, the present disclosure provides a force-feedback system for providing feedback to an operator input device. The force-feedback response may be tuned for a desired feedback characteristic based on a given application, in turn increasing customer satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A force-feedback assembly comprising:
   a shaft having a shaft end, the shaft being movable between a shaft first position and a shaft second position;
   a compliant element arranged to exert a return force on the shaft and bias the shaft toward the shaft first position;
   a ramp in sliding engagement with the shaft end;
   an operator input device operatively coupled to the ramp, the operator input device having a device first position and a device second position, wherein moving the operator input device from the device first position to the device second position slides the ramp relative to the shaft end and moves the shaft from the shaft first position to the shaft second position; and
   a cam operatively coupled to the operator input device, wherein a surface of the cam has an apply rate profile defining the ramp, and wherein moving the operator input device from the device first position to the device second position drives the cam in a pivoting motion.

2. The force-feedback assembly of claim 1, wherein the compliant element comprises a spring.

3. The force-feedback assembly of claim 2, wherein the spring includes a spring stack with a nonlinear spring rate.

4. The force-feedback assembly of claim 1, wherein the ramp has a nonlinear profile.

5. The force-feedback assembly of claim 1, wherein the apply rate profile has a nonlinear progression.

6. A vehicle comprising:
   an electronically-controlled subsystem;
   an operator-actuatable input device, the input device having a first position and a second position;
   a compliant element arranged to exert a return force on the input device from the second position to the first position;
   a first shaft coupled to the input device, the first shaft being provided with a ramp,
   a second shaft operatively coupling the compliant element to the first shaft, the second shaft including a shaft end in sliding engagement with the ramp such that moving the input device from the first position to the second position slides the ramp relative to the shaft end and drives the second shaft in translation, wherein the compliant element is arranged to exert the return force on the second shaft;
   at least one sensor arranged to detect operator actuation of the input device;
   a controller programmed to control the subsystem in response to operator actuation of the input device; and
   a force-feedback device arranged to provide force-feedback to the input device in response to operator actuation of the input device, the force-feedback device having a spring rate tunable independently of rate progression of the input device from the first position to the second position.

7. The vehicle of claim 6, wherein the compliant element has a nonlinear spring rate.

8. The vehicle of claim 6, wherein the compliant element comprises a spring stack.

9. The vehicle of claim 6, wherein the ramp has a nonlinear profile.

10. The vehicle of claim 6, further comprising a cam operatively coupled to the second shaft, wherein a surface of the cam has an apply rate profile defining the ramp, and wherein moving the input device from the first position to the second position drives the cam in a pivoting motion.

11. The vehicle of claim 10, wherein the apply rate profile has a nonlinear progression.

12. A drive-by-wire system comprising:
   an electronically-controlled subsystem;
   an operator-actuatable input device movable between a device first position and a device second position;
   at least one sensor arranged to detect operator actuation of the input device;
   a controller programmed to control the subsystem in response to operator actuation of the input device;
   a shaft having a shaft end, the shaft being movable between a shaft first position and a shaft second position;
   a compliant element arranged to exert a return force on the shaft and bias the shaft toward the shaft first position; and
   a ramp operatively coupled with the input device and in sliding engagement with the shaft end, wherein moving the input device from the device first position to the device second position slides the ramp relative to the shaft end and moves the shaft from the shaft first position to the shaft second position.

13. The drive-by-wire system of claim 12, wherein the compliant element comprises a spring.

14. The drive-by-wire system of claim 13, wherein the spring includes a spring stack with a nonlinear spring rate.

15. The drive-by-wire system of claim 12, wherein the ramp has a nonlinear profile.

16. The drive-by-wire system of claim 12, further comprising a cam operatively coupled to the input device, wherein a surface of the cam has an apply rate profile defining the ramp, and wherein moving the operator input device from the device first position to the device second position drives the cam a pivoting motion.

* * * * *